(12) United States Patent
Yoshihisa

(10) Patent No.: US 7,982,424 B2
(45) Date of Patent: Jul. 19, 2011

(54) DOCUMENT READING APPARATUS, DOCUMENT READING METHOD, AND PROGRAM FOR READING DOCUMENT

(75) Inventor: Yasuhiko Yoshihisa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 382 days.

(21) Appl. No.: 12/228,220

(22) Filed: Aug. 11, 2008

(65) Prior Publication Data

US 2009/0041440 A1  Feb. 12, 2009

(30) Foreign Application Priority Data

Aug. 9, 2007 (JP) ................. 2007-208407
Jun. 25, 2008 (JP) ................. 2008-166313

(51) Int. Cl.
*G05B 11/42* (2006.01)

(52) U.S. Cl. ........ 318/610; 318/609; 318/602; 318/616; 318/560

(58) Field of Classification Search .................. 318/610, 318/609, 560, 602, 616, 439
See application file for complete search history.

(56) References Cited

U.S. PATENT DOCUMENTS

| 4,623,827 | A | * | 11/1986 | Ito ................................ 388/811 |
| 6,037,734 | A | * | 3/2000 | Toyomura .................... 318/602 |
| 6,812,668 | B2 | * | 11/2004 | Akiyama .................... 318/610 |

FOREIGN PATENT DOCUMENTS

| JP | 05-088752 | 4/1993 |
| JP | 06-067732 | 3/1994 |
| JP | 06-121576 | 4/1994 |
| JP | 06-237588 | 8/1994 |
| JP | 2001-251878 | 9/2001 |
| JP | 2003-204690 | 7/2003 |

* cited by examiner

*Primary Examiner* — Walter Benson
*Assistant Examiner* — David S Luo
(74) *Attorney, Agent, or Firm* — Nutter McClennen & Fish LLP; John J. Penny, Jr.

(57) ABSTRACT

The invention provides, as an aspect thereof, an document reading apparatus that includes: a speed calculating unit that calculates a speed related to the rotation of a motor on the basis of a signal that is outputted from an encoder; and a controlling unit that calculates control amount on the basis of the speed calculated by the speed calculating unit so as to control the rotation of the motor in accordance with the calculated control amount. In the configuration of an document reading apparatus according to this aspect of the invention, the above-mentioned controlling unit controls the motor with an increase in the control amount in a case where there occurs no change in the signal that is outputted from the encoder for a certain period of time. The increase in the control amount is based on the length of time that has elapsed since the last change in the signal.

10 Claims, 10 Drawing Sheets

MAIN-SCAN DIRECTION
SUB-SCAN DIRECTION

DOCUMENT READING APPARATUS, DOCUMENT READING METHOD, AND PROGRAM FOR READING DOCUMENT

BACKGROUND

1. Technical Field

The present invention relates to an document reading apparatus and an document reading method. In addition, the invention further relates to a program for causing an document reading apparatus to execute the steps of an document reading method.

2. Related Art

In the technical field to which the present invention pertains, a device that controls the rotation speed of a motor on the basis of the pulse cycle of a pulse signal that is outputted from a rotary encoder is known. When such a controller of the related art controls the rotation speed of a motor, a speed that is calculated on the basis of the last-acquired pulse time interval is taken as the current rotation speed of the motor. An example of such a control of the related art is described in JP-A-2001-251878.

That is, in such a related-art control, the speed that is used for controlling the rotation speed of the motor is calculated on the basis of the last-acquired pulse time interval. If the speed that is calculated on the basis of the last-acquired pulse time interval is simply regarded as the current rotation speed of the motor, and under the condition that the actual rotation speed of the motor is getting lower and lower, it follows that the actual rotation speed of the motor is slower than the speed calculated on the basis of the last-acquired pulse time interval.

Under such a condition, it further follows that a speed that is higher than the actual rotation speed of the motor is used for the computation of the controlling amount thereof when performing PID control on the rotation of the motor on the basis of the rotation speed thereof. Accordingly, under the condition that the actual rotation speed of the motor is decreasing, a difference between the target speed thereof and the current speed thereof will become smaller than otherwise. This means that the motor is controlled on the basis of a poorly calculated control amount that is smaller than a required controlling amount that should be calculated on the basis of the actual rotation speed of the motor. As a consequence thereof, if such a typical motor-controlling method of the related art is adopted, it is practically impossible or at best difficult to obtain a required controlling amount under the speed-decreasing condition explained above, which could result in any unintended stop of motor rotation.

SUMMARY

An advantage of some aspects of the invention is to adequately control the operation of a control target object even under the condition that the cycle of a change of a signal that is outputted from an encoder becomes longer.

In order to offer the feature(s) and advantage(s) explained above, a main aspect of the invention provides an document reading apparatus that includes: a speed calculating section that calculates a speed related to the rotation of a motor on the basis of a signal that is outputted from an encoder; and a controlling section that calculates control amount on the basis of the speed calculated by the speed calculating section so as to control the rotation of the motor in accordance with the calculated control amount, the controlling section controlling the motor with an increase in the control amount in a case where there occurs no change in the signal that is outputted from the encoder for a certain period of time, the increase in the control amount being based on the length of time that has elapsed since the last change in the signal.

Other features and advantages offered by the invention will be fully understood by referring to the following detailed description in conjunction with the accompanying drawings.

A person skilled in the art will fully understand at least the following novel and inventive concept of the invention through intensive reading of the detailed description of this specification with reference to accompanying drawings with due care.

In order to address the above-identified problem without any limitation thereto, the invention provides, as a first aspect thereof, an document reading apparatus that includes: a speed calculating section that calculates a speed related to the rotation of a motor on the basis of a signal that is outputted from an encoder; and a controlling section that calculates control amount on the basis of the speed calculated by the speed calculating section so as to control the rotation of the motor in accordance with the calculated control amount, the controlling section controlling the motor with an increase in the control amount in a case where there occurs no change in the signal that is outputted from the encoder for a certain period of time, the increase in the control amount being based on the length of time that has elapsed since the last change in the signal.

If the configuration of an document reading apparatus according to the first aspect of the invention described above is adopted, it is possible to adequately control the operation of a control target object even under the condition that the cycle of a change of a signal that is outputted from an encoder becomes longer.

In the configuration of an document reading apparatus according to the first aspect of the invention described above, it is preferable that the control amount should be relatively large when the time that has elapsed since the last change in the signal is relatively long in comparison with a control amount that will be obtained when the time that has elapsed since the last change in the signal is relatively short. In the configuration of an document reading apparatus according to the first aspect of the invention described above, it is preferable that, if a time interval of changes in the signal under the condition that the speed related to the rotation of the motor reaches and/or is at a target speed is defined as a reference time interval, the increase in the control amount should include such an amount that is in proportion to a value obtained by subtracting the inverse number of the elapsed time from the inverse number of the reference time interval. In the configuration of an document reading apparatus according to the first aspect of the invention described above, it is preferable that the speed related to the rotation of the motor should be calculated on the basis of the time interval of the last change in the signal. In the configuration of an document reading apparatus according to the first aspect of the invention described above, it is preferable that the controlling section should perform PID control on the basis of the speed related to the rotation of the motor so as to control the rotation of the motor in a case where there occurs a change in the signal that is outputted from the encoder in the above-mentioned certain period of time, whereas the controlling section should increase the control amount with the addition of another control amount on the basis of the elapsed time to a PID control amount that is based on the speed related to the rotation of the motor in a case where there occurs no change in the signal that is outputted from the encoder for the above-mentioned certain period of time.

In the preferred configuration of an document reading apparatus described above, according to which the controlling section performs PID control on the basis of the speed related to the rotation of the motor so as to control the rotation of the motor in a case where there occurs a change in the signal that is outputted from the encoder in the above-mentioned certain period of time, whereas the controlling section increases the control amount with the addition of another control amount on the basis of the elapsed time to a PID control amount that is based on the speed related to the rotation of the motor in a case where there occurs no change in the signal that is outputted from the encoder for the above-mentioned certain period of time, it is preferable that an integral, which is one component of the PID control amount, should be calculated on the basis of the elapsed time in a case where there occurs no change in the signal that is outputted from the encoder for the above-mentioned certain period of time. In the configuration of an document reading apparatus according to the first aspect of the invention described above, it is preferable that the above-mentioned change in the signal that is outputted from the encoder should be either the rising of a pulse that is outputted from the encoder or the falling of a pulse that is outputted from the encoder. In the configuration of an document reading apparatus according to the first aspect of the invention described above, it is preferable that the speed calculating section should calculate the speed related to the rotation of the motor on the basis of a time interval between the rising or the falling of one encoder output pulse and the rising or the falling of the other encoder output pulse.

If the preferred configuration of an document reading apparatus described above is adopted, it is possible to adequately control the operation of a control target object even under the condition that the cycle of a change of a signal that is outputted from an encoder becomes longer.

In order to address the above-identified problem without any limitation thereto, the invention provides, as a second aspect thereof, an document reading method that includes: calculating a speed related to the rotation of a motor on the basis of a signal that is outputted from an encoder; and calculating control-amount on the basis of the speed calculated so as to control the rotation of the motor in accordance with the calculated control amount, and then controlling the motor with an increase in the control amount in a case where there occurs no change in the signal that is outputted from the encoder for a certain period of time, the increase in the control amount being based on the length of time that has elapsed since the last change in the signal.

If an document reading method according to the second aspect of the invention described above is adopted, it is possible to adequately control the operation of a control target object even under the condition that the cycle of a change of a signal that is outputted from an encoder becomes longer.

In order to address the above-identified problem without any limitation thereto, the invention provides, as a third aspect thereof, a program for operating an document reading apparatus according to the first aspect of the invention so as to execute an document reading method according to the second aspect of the invention, the document reading method executed by the document reading apparatus in accordance with the program including: calculating a speed related to the rotation of a motor on the basis of a signal that is outputted from an encoder; and calculating control amount on the basis of the speed calculated so as to control the rotation of the motor in accordance with the calculated control amount, and then controlling the motor with an increase in the control amount in a case where there occurs no change in the signal that is outputted from the encoder for a certain period of time, the increase in the control amount being based on the length of time that has elapsed since the last change in the signal.

If a program according to the third aspect of the invention described above is adopted, it is possible to adequately control the operation of a control target object even under the condition that the cycle of a change of a signal that is outputted from an encoder becomes longer.

BRIEF DESCRIPTION OF THE DRAWINGS

The invention will be described with reference to the accompanying drawings, wherein like numbers reference like elements.

FIG. 6 is a set of encoder output diagrams; more specifically.

DESCRIPTION OF EXEMPLARY EMBODIMENTS

Configuration of Scanner According to Exemplary Embodiment of the Invention

Figure 1:
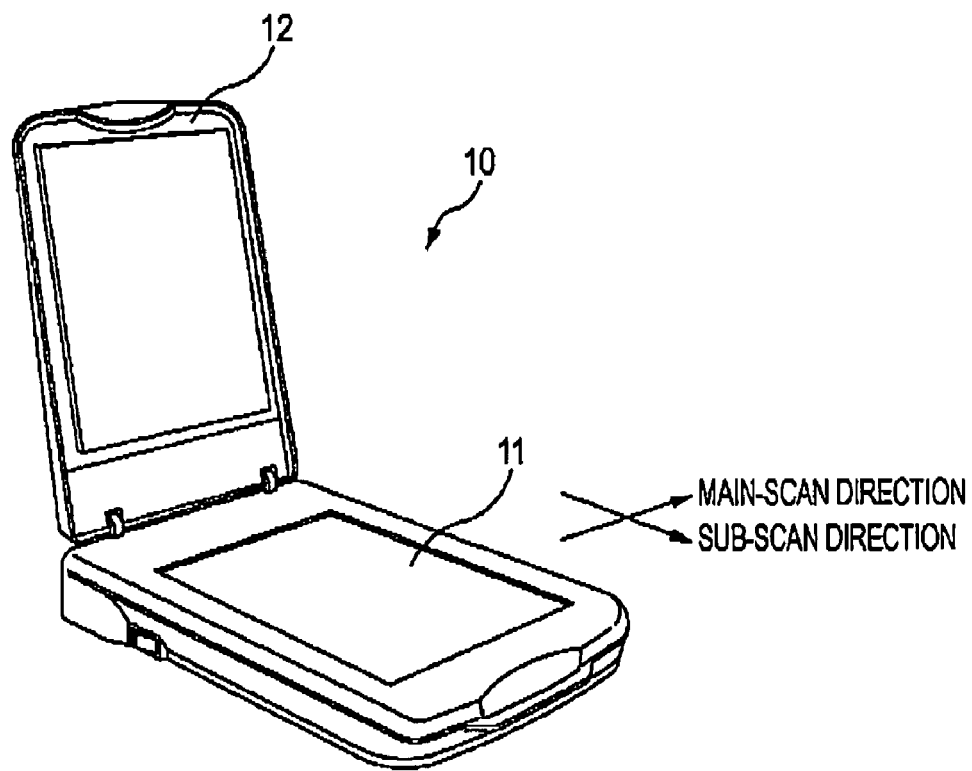
FIG. 1 is a perspective view that schematically illustrates an example of the general appearance of a scanner 10 according to an exemplary embodiment of the invention.
Figure 2:
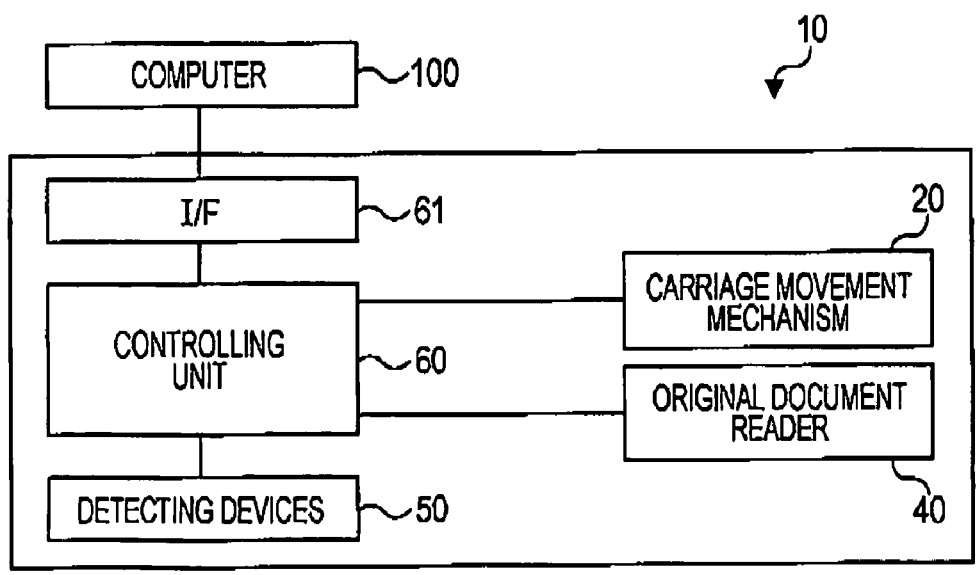
FIG. 2 is a block diagram that schematically illustrates an example of the configuration of the scanner 10 according to an exemplary embodiment of the invention.

FIG. 1 is a perspective view that schematically illustrates an example of the general appearance of a scanner 10 according to an exemplary embodiment of the invention. FIG. 2 is a block diagram that schematically illustrates an example of the configuration of the scanner 10 according to an exemplary embodiment of the invention. The scanner 10 is an apparatus that reads (i.e., scans) an document that is placed on an document table 11 thereof. Before scanning operation is executed, a user sets an original copy on the original copy table 11 and then closes the cover 12. Upon reception of a scanning instruction from the user, which is inputted from a personal computer 100 that is connected to the scanner 10, the scanner 10 reads the document so as to acquire image information thereof. Then, the scanner 10 sends the acquired image data to the personal computer 100.

The scanner 10 is provided with a carriage movement mechanism 20, an document reader 40, a set of detecting devices 50, a controlling unit 60, and an interface unit 61.

The carriage movement mechanism 20 moves, in the sub-scan direction, the document reader 40, the configuration and function of which are briefly explained in the next paragraph.

The function of the document reader 40 is to scan an document that is set on the document table 11 of the scanner 10. The document reader 40 is provided with an image sensor 41. A more detailed explanation of the configuration and functional operation of the image sensor 41 as well as the controlling of the movement thereof will be given later. The carriage movement mechanism 20 moves the document reader 40 in the sub-scan direction. While traveling in the sub-scan direction, the document reader 40 scans (i.e., reads) an document so as to acquire image information thereof. Then, the document reader 40 sends the acquired image data to the controlling unit 60.

The set of detecting devices 50 is made up of a plurality of scanner-status detectors. The group of detecting devices 50 measures the operation state of various components of the scanner 10 and then sends the obtained status data to the controlling unit 60. A rotary encoder 51 is included as a component of these detectors 50. The function of the rotary encoder 51 is to measure the rotation amount of a driving motor that supplies a driving force for the movement of a carriage 21. A more detailed explanation of the configuration and operation of the rotary encoder 51 will be given later.

The controlling unit 60 is a device that controls the entire operation of the scanner 10. The controlling unit 60 performs such control on the basis of the scanner-status information that is received from the group of detecting devices 50, which measures the operation state of each functional unit of the scanner 10 as explained above. In addition, the controlling unit 60 performs various kinds of processing on the scanned data that is sent from the document reader 40. Then, the controlling unit 60 sends the processed data to the personal computer 100 via the interface 61. The controlling unit 60 has a processor and a memory device, which are not shown in the drawing. The memory device is a ROM or a RAM. A program that is used for the operation of the processing unit 60 is stored in the memory device. In addition, other control-related information is stored in the memory device. The processor is an arithmetic and logic unit such as CPU or the like. In accordance with the program, the processor controls each functional unit of the scanner 10. The controller 60 is provided with a PID controlling unit 62 and a PWM circuit 63. The PID controlling unit 62 performs an operation (i.e., calculation) for controlling the driving operation of a driving motor 22. A more detailed explanation of these components of the controller 60 will be given later.

The interface unit 61 is used for connection with the personal computer 100. A non-limiting example of the interface unit 61 is a USB interface. The interface unit 61 is provided so as to enable data communication with the personal computer 100.

Figure 3:
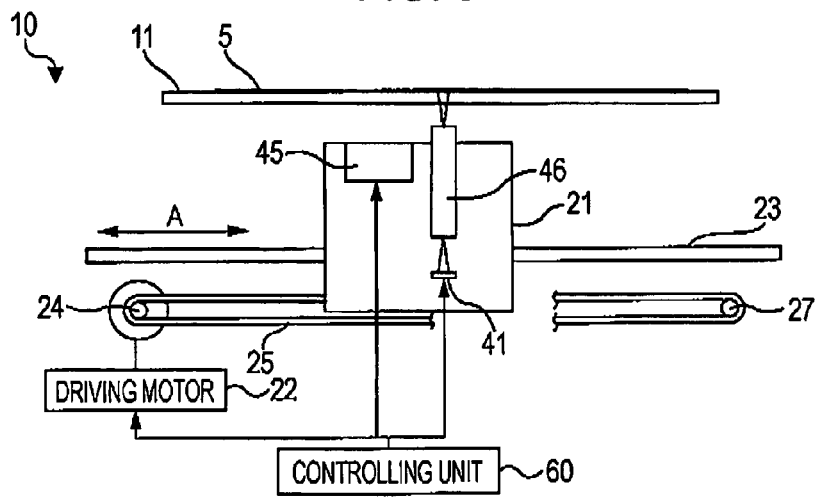
FIG. 3 is a sectional view that schematically illustrates an example of the inner configuration of the scanner 10 according to an exemplary embodiment of the invention.

FIG. 3 is a sectional view that schematically illustrates an example of the inner configuration of the scanner 10 according to an exemplary embodiment of the invention. The scanner 10 is provided with the carriage 21 and the carriage movement mechanism 20. Each of the carriage 21 and the carriage movement mechanism 20 is provided under/below the document table 11. The carriage movement mechanism 20 moves the carriage 21 in the sub-scan direction, which is shown by an arrow A in the drawing, in parallel with the document table 11. Thus, the carriage 21 travels in the sub-scan direction in such a manner that a predetermined distance is kept between the carriage 21 and the document table 11 during the movement thereof.

The carriage movement mechanism 20 includes a guide rail that guides the movement of the carriage 21 while providing a mechanical support thereto. That is, the carriage 21 travels along the guide rail 23. The carriage movement mechanism 20 further includes a belt 25, a shaft 24, a pulley 27, and a driving motor 22. The carriage 21 is fixed to the belt 25. The belt 25 is wound around the shaft 24 and the pulley 27 so that it is stretched therebetween. The driving motor 22 provides a driving force for the rotation of the shaft 24. The driving motor 22 operates in accordance with a control signal that is sent from the controlling unit 60. The carriage movement mechanism 20 is further provided with a main gear wheel 28, which is a large gear, and a pinion 29, which is a small gear. Note that the large gear wheel 28 and the small gear wheel 29 are not illustrated in FIG. 3 (refer to FIG. 4).

Optical components that make up the document reader 40 are provided inside the carriage 21. More specifically, a light-exposure lamp 45, a lens 46, and the aforementioned image sensor 41 are provided inside the carriage 21. The light-exposure lamp 45 irradiates a beam of light toward a sheet of document 5 through the document table 11. That is, the light-exposure lamp 45 functions as a light-source component of the document reader 40. Light emitted from the light-exposure lamp 45 is reflected at the sheet of document 5. Then, the reflected light enters the carriage 21 through the lens 46. The image sensor 41 receives the reflected light that has passed through the lens 46.

The image sensor 41 is formed as a linear CCD sensor, which has an array of photoelectric conversion elements (i.e., opto-electric transducers) that convert light into an electric signal. A non-limiting example of such a photoelectric conversion element is a photodiode. The image sensor 41 is a CIS (Contact Image Sensor), which has an array width corresponding to the maximum readable sheet size of the document 5. That is, the image sensor 41 can scan the document 5 that is set on the document table 11 without any reduction in scale (i.e., 1× magnification). Image data that is acquired by the image sensor 41 is outputted to the controlling unit 60.

Figure 4:
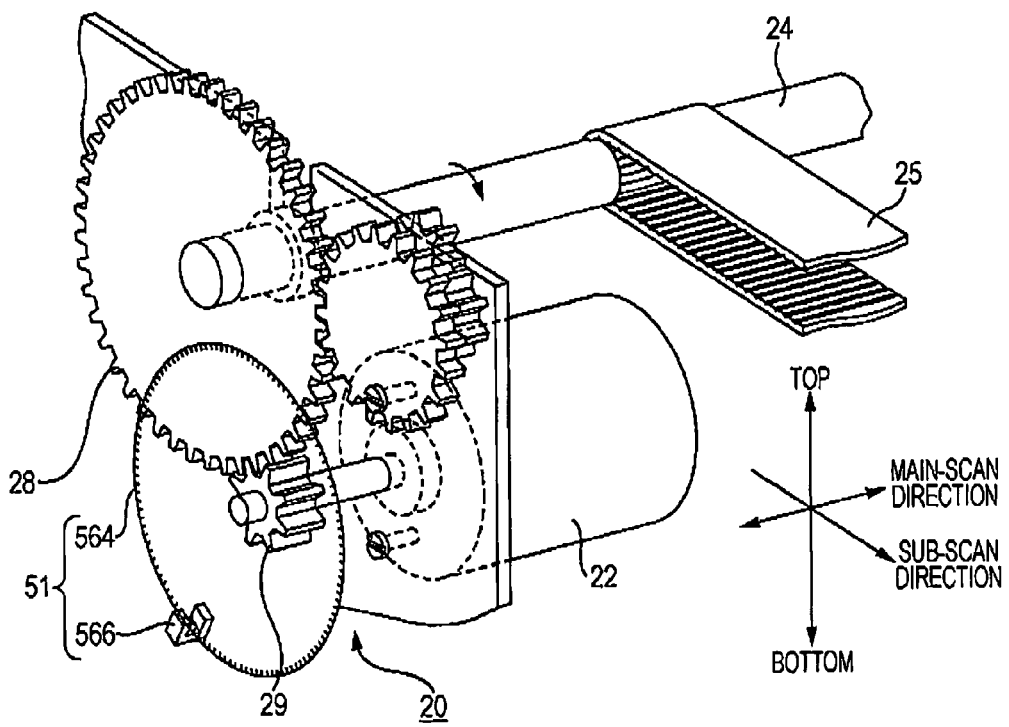
FIG. 4 is a mechanical diagram that schematically illustrates an example of the configuration of a rotary encoder 51 as well as a part of a carriage movement mechanism 20 of the scanner 10 according to an exemplary embodiment of the invention.

FIG. 4 is a mechanical diagram that schematically illustrates an example of the configuration of the rotary encoder 51 as well as a part of the carriage movement mechanism 20 of the scanner 10 according to an exemplary embodiment of the invention. The rotary encoder 51 is provided with a rotary disc 564. The rotary disc 564 rotates as the motor-power-output axis of the driving motor 22 turns. The rotary disc 564 has a number of small slits. These slits are formed with a predetermined pitch. The rotary disc 564 of the rotary encoder 564 and the small gear wheel 29 of the carriage movement mechanism 20, the latter of which is fixed to the driving-force-output axis of the driving motor 22, are formed as a single assembled member. Because of such a structure, the rotary disc 564 of the rotary encoder 564 rotates as the motor-power-output axis of the driving motor 22 rotates. Therefore, it is possible to acquire information on the amount of rotation of the driving motor 22 as a result of the measurement of the rotation amount of the rotary disc 564.

The large gear wheel 28 is fixed to the shaft 24 around which "one end" of the endless belt 25 is wound. The large gear wheel 28 and the small gear wheel 29, the latter of which is fixed to the driving-force-output axis of the driving motor 22, engage with each other. Therefore, the shaft 24 turns as the driving motor 22 rotates. As the shaft 24 rotates, the belt 25 moves. Since a combination of the carriage movement mechanism 20 and the rotary encoder 51 has the mechanical structure explained above, it is possible to acquire, on the basis of the output of the rotary encoder 51, information on the rotation speed of the driving motor 22, and thus, information on the traveling speed (i.e., movement speed) of the carriage 21 that is fixed to the belt 25, one end of which is wound around the shaft 24.

Optical and Electric Configuration of Rotary Encoder 51

Figure 5:
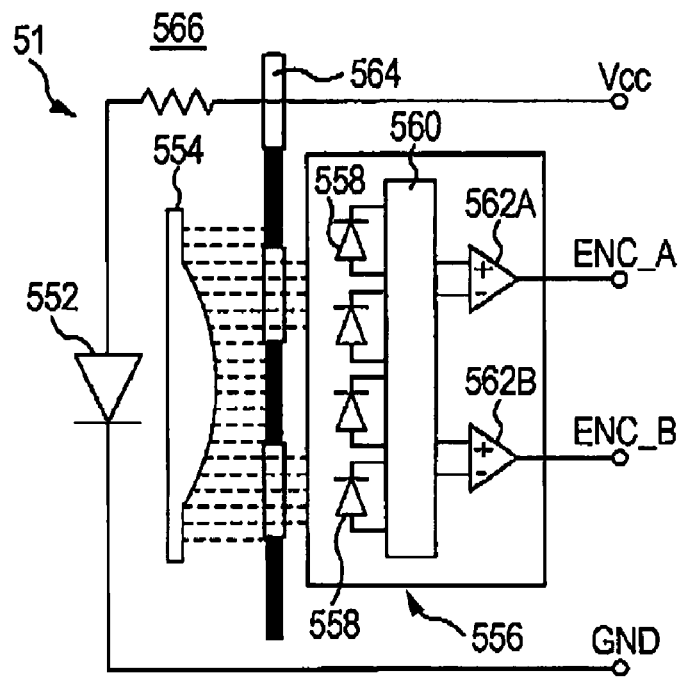
FIG. 5 is an optical and electric diagram that schematically illustrates an example of the configuration of the rotary encoder 51 of the scanner 10 according to an exemplary embodiment of the invention.

FIG. 5 is an optical and electric diagram that schematically illustrates an example of the configuration of the rotary encoder 51 of the scanner 10 according to an exemplary embodiment of the invention. In addition to the rotary disc 564 explained above, the rotary encoder 51 has a detecting unit 566. As has already been explained above, the rotary disc 564 has a number of small slits that are formed at predetermined intervals. The rotary disc 564 of the rotary encoder 51 is fixed to the motor-power-output axis of the driving motor 22. In the description of this specification, it is assumed that four hundred and forty-eight (448) slits are formed in the rotary disc 564 for one rotation thereof.

The detecting unit 566 has a concave shape in such a manner that the slits of the rotary disc 564 pass through one after another between one projecting portion of thereof (i.e., detecting unit 566) and the other opposite portion thereof. The detecting unit 566 of the rotary encoder 51 is fixed to the body of the scanner 10. The detecting unit 566 of the rotary encoder 51 has a light emitting diode (LED) 552, a collimator lens (i.e., collimating lens) 554, and a detection-processing unit 556. The detection-processing block 556 of the detecting unit 566 has a plurality of photodiodes 558, a signal processing circuit 560, and two comparators 562A and 562B. In the illustrated exemplary configuration thereof, four photodiodes 558 are provided in the detection-processing unit 556.

The light emitting diode 552 emits a beam of light at the time when a voltage Vcc is applied thereto through a resistor that is provided at each end thereof. The light emitted from the light emitting diode 552 enters the collimator lens 554 as an incident light beam. The light that has been emitted from the light emitting diode 552 and then entered the collimator lens 554 as an incident light beam is turned into parallel light at the collimating lens 554. The collimator lens 554 irradiates this parallel light toward the rotary disc 564. Some of the parallel light passes through the slit formed in the rotary disc 564.

Some of the parallel light that has passed through the rotary slit further passes through a fixed slit, which is not shown in the drawing. Each beam of light that has passed through the fixed slit enters the corresponding photodiode 558 as an incident light beam. Each of the photodiodes 558 converts the incident light beam into an electric signal. The electric signal that is outputted from each of the photodiodes 558 is subjected to comparison at the comparator 562A/562B. The result of the comparison is then outputted in the form of a pulse. A first pulse ENC_A, which is outputted from the first comparator 562A, and a second pulse ENC_B, which is outputted from the second comparator 562B, constitutes the output of the rotary encoder 51.

Figure 6A:
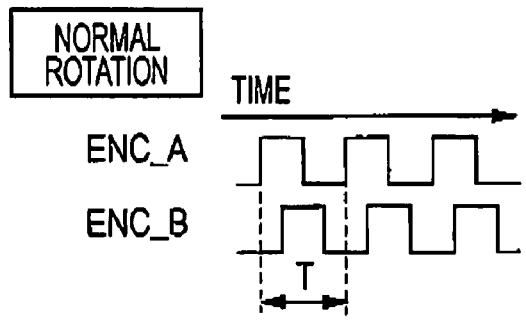
FIG. 6A is a timing chart that schematically illustrates a waveform example of an output signal (i.e., the first pulse ENC_A and the second pulse ENC_B) of the rotary encoder 51 of the scanner 10 according to an exemplary embodiment of the invention under the normal rotation of a driving motor 22 thereof.
Figure 6B:
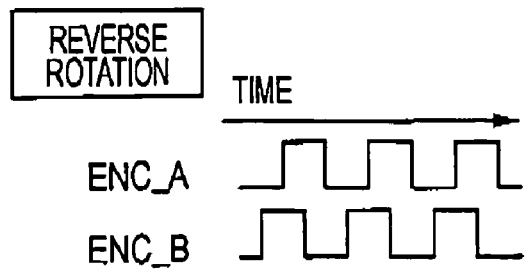
FIG. 6B is a timing chart that schematically illustrates a waveform example of an output signal of the rotary encoder 51 of the scanner 10 according to an exemplary embodiment of the invention under the reverse rotation of the driving motor 22 thereof.

FIG. 6A is a timing chart that schematically illustrates a waveform example of an output signal (i.e., the first pulse ENC_A and the second pulse ENC_B) of the rotary encoder 51 of the scanner 10 according to an exemplary embodiment of the invention under the normal rotation of the driving motor 22 thereof. FIG. 6B is a timing chart that schematically illustrates a waveform example of an output signal of the rotary encoder 51 of the scanner 10 according to an exemplary embodiment of the invention under the reverse rotation of the driving motor 22 thereof.

As illustrated in these drawings, during each of the normal operation of the driving motor 22 and the reverse operation thereof, the first pulse ENC_A and the second pulse ENC_B are shifted from each other in terms of phase by ninety degrees (90°). More specifically, as shown in FIG. 6A, the first pulse ENC_A is ahead of the second pulse ENC_B by 90° when the driving motor 22 is rotated in the normal direction. On the other hand, as shown in FIG. 6B, the first pulse ENC_A is behind the second pulse ENC_B by 90° when the driving motor 22 is rotated in the reverse direction. One cycle of each pulse, which is denoted as T in the drawing as well as in the following description, equals to the length of time throughout which one pitch (e.g., interval) of the slits of the rotary disc 564 moves through the detecting unit 566.

The first pulse ENC_A and the second pulse ENC_B that are outputted from the rotary encoder 51 are inputted into the controlling unit 60. As will be described in detail later, the controlling unit 60 generates an "encoder interruption" at each time when either the rising edge or the falling edge of either the first pulse ENC_A or the second pulse ENC_B is detected.

Figure 7:
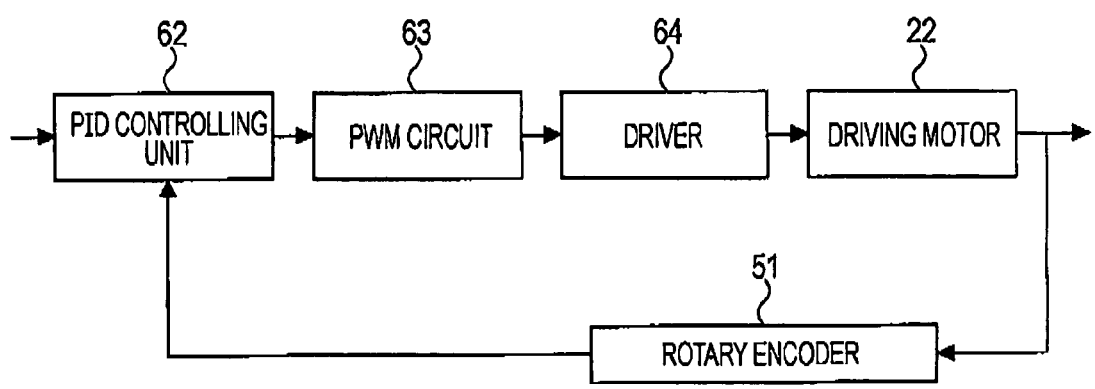
FIG. 7 is a block diagram that schematically illustrates an example of the configuration of the driving-motor-controlling components of the scanner 10 according to an exemplary embodiment of the invention, which control the operation of the driving motor 22 thereof.

FIG. 7 is a block diagram that schematically illustrates an example of the configuration of the driving-motor-controlling components of the scanner 10 according to an exemplary embodiment of the invention, which control the operation of the driving motor 22 thereof. The driving-motor-controlling components of the scanner 10, which control the operation of the driving motor 22, include the aforementioned PID controlling unit 62, the aforementioned PWM circuit 63, a driver 64, the driving motor 22 (itself), and the rotary encoder 51.

The PID controlling unit 62, the PWM circuit 63, and the driver 64 are the components of the controlling unit 60. The driving motor 22 is included in the carriage movement mechanism 20. The rotary encoder 51 is included in the aforementioned set of detecting devices 50.

The PID controlling unit 62 performs an operation for controlling the rotation speed of the driving motor 22 so as to achieve a desired motor rotation speed. The PID controlling unit 62 performs such calculation on the basis of an encoder interruption and a "timer interruption". A more detailed explanation as to how the PID controlling unit 62 controls, that is, performs an operation for controlling the rotation speed of, the driving motor 22 so as to achieve a desired motor rotation speed will be given later.

The PWM circuit 63 generates a control signal in accordance with the result of calculation outputted from the PID controlling unit 62. The driver 64 operates the driving motor 22 on the basis of the control signal that is generated by the PWM circuit 63. In the following description of this specification, it is assumed that the control signal is outputted in the form of a pulse that has a variable length. The controlling amount (i.e., control amount) thereof is expressed in the unit of duty. The driver 64 is provided with, for example, a plurality of transistors. The driver 64 turns these transistors ON/OFF on the basis of a control signal that is inputted from the PWM circuit 63. As a result thereof, a voltage is applied to the driving motor 22.

Upon the application of a voltage thereto, the driving motor 22 rotates. As the driving motor 22 turns, the rotary disc 564 of the rotary encoder 51, which is fixed to the motor-power-output axis of the driving motor 22, also rotates. Information on the rotation amount of the rotary disc 564 of the rotary encoder 51 is sent to the PID controlling unit 62 of the controlling unit 60. That is, information on the rotation amount of the rotary disc 564 of the rotary encoder 51 is fed back to the PID controlling unit 62 of the controlling unit 60. Through such feedback control, the driving-motor-controlling components of the scanner 10 according to an exemplary embodiment of the invention can control the rotation amount of the driving motor 22.

Controlling Method of Related Art

In a typical motor-controlling method of some related art, the current rotation speed of a driving motor (22) is calculated on the basis of a time interval that is measured from either the rising edge of a pulse that is outputted from a rotary encoder (51) or the falling edge thereof for controlling the rotation speed thereof on the basis of the encoder output. Herein, it is assumed that an encoder interruption is generated at each time when the pulse rises or falls. In such a typical motor-controlling method of some related art, when the rotation of the driving motor (22) is controlled, a speed that is calculated on the basis of a time interval between the last two encoder interruptions is taken as the current rotation speed of the driving motor (22). If a speed that is calculated on the basis of a time interval between the last two encoder interruptions is simply regarded as the current rotation speed of the driving motor (22), and under the condition that the actual rotation speed of the driving motor (22) is getting lower and lower, it follows that the actual rotation speed of the driving motor (22) is slower than the speed calculated on the basis of the time interval between the last two encoder interruptions.

Under such a condition, it further follows that a speed that is higher (i.e., faster) than the actual rotation speed of the driving motor (22) is used for the computation of the controlling amount thereof when performing PID control on the rotation of the driving motor (22) on the basis of the rotation speed thereof. Accordingly, under the condition that the actual rotation speed of the driving motor (22) is decreasing, a difference (e.g., deviation, though not limited thereto) between the target speed (e.g., reference speed, though not limited thereto) thereof and the current speed thereof will become smaller than otherwise. This means that the driving motor 22 is controlled on the basis of a poorly calculated control amount that is smaller than a required controlling amount that should be calculated on the basis of the actual rotation speed of the driving motor (22). As a consequence thereof, if such a typical motor-controlling method of some related art is adopted, it is practically impossible or at best difficult to obtain a required controlling amount under the speed-decreasing condition explained above, which could result in the unintended stop of the rotation of the driving motor (22).

Even worse, since the PID controlling unit (62) continues to regard the speed that is calculated on the basis of the time interval between the last two encoder interruptions as the current rotation speed of the driving motor (22), it is practically impossible or at best difficult to resume (i.e., restart) the rotation of the driving motor (22).

In order to overcome the above-described problems, though not necessarily limited thereto, the unique controlling of the rotation of the driving motor 22 according to the present embodiment of the invention, which will be explained in detail below, ensures that the driving motor 22 is controlled with a controlling amount that is large enough so as not to cause any unintended stop of the rotation thereof even under the condition that the actual rotation speed of the driving motor 22 is getting slower and slower.

Figure 8:
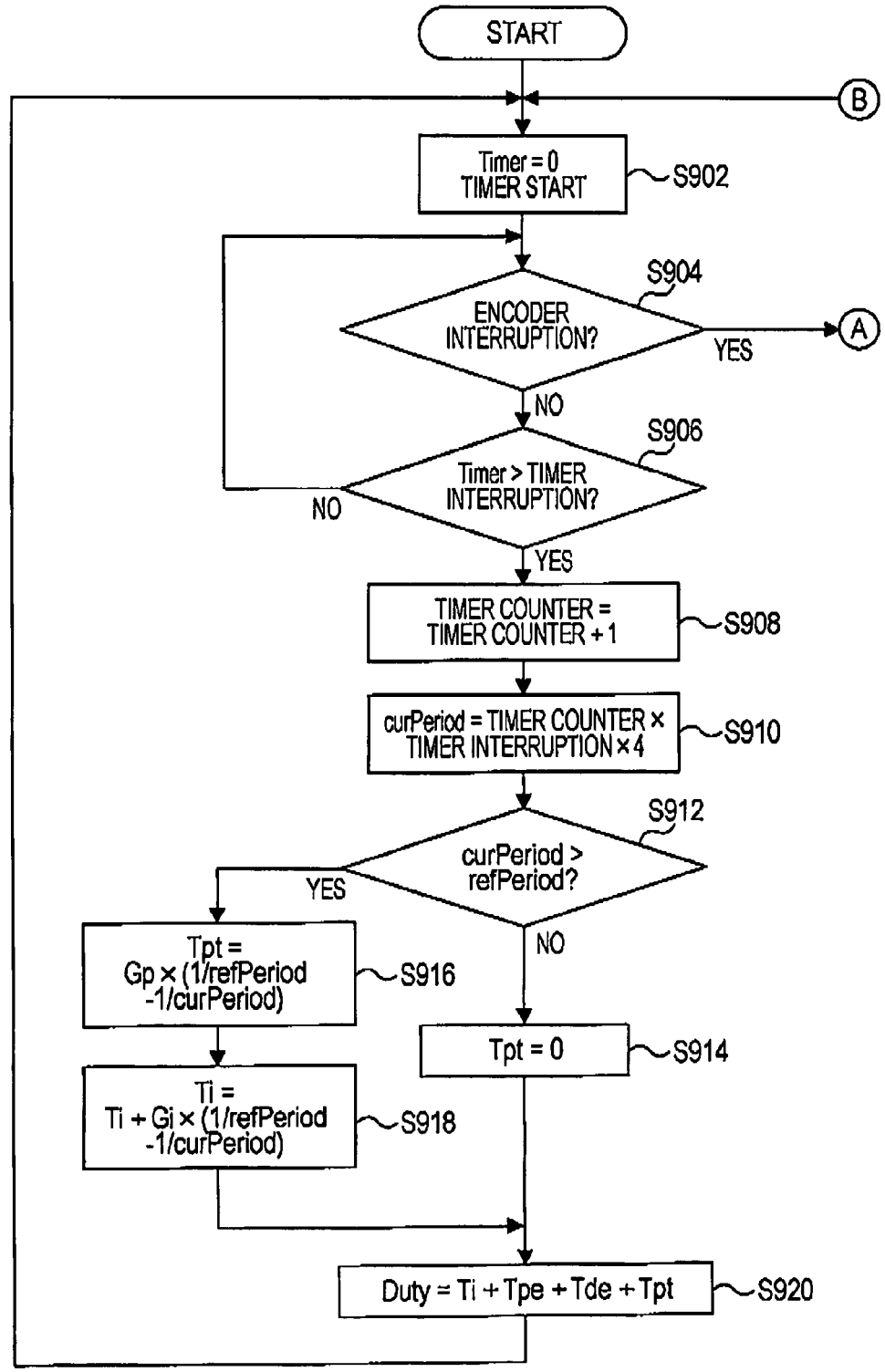
FIG. 8 is a flowchart (Part I) that schematically illustrates an example of the processing flow for controlling the rotation of the driving motor 22 of the scanner 10 according to an exemplary embodiment of the invention.
Figure 9:
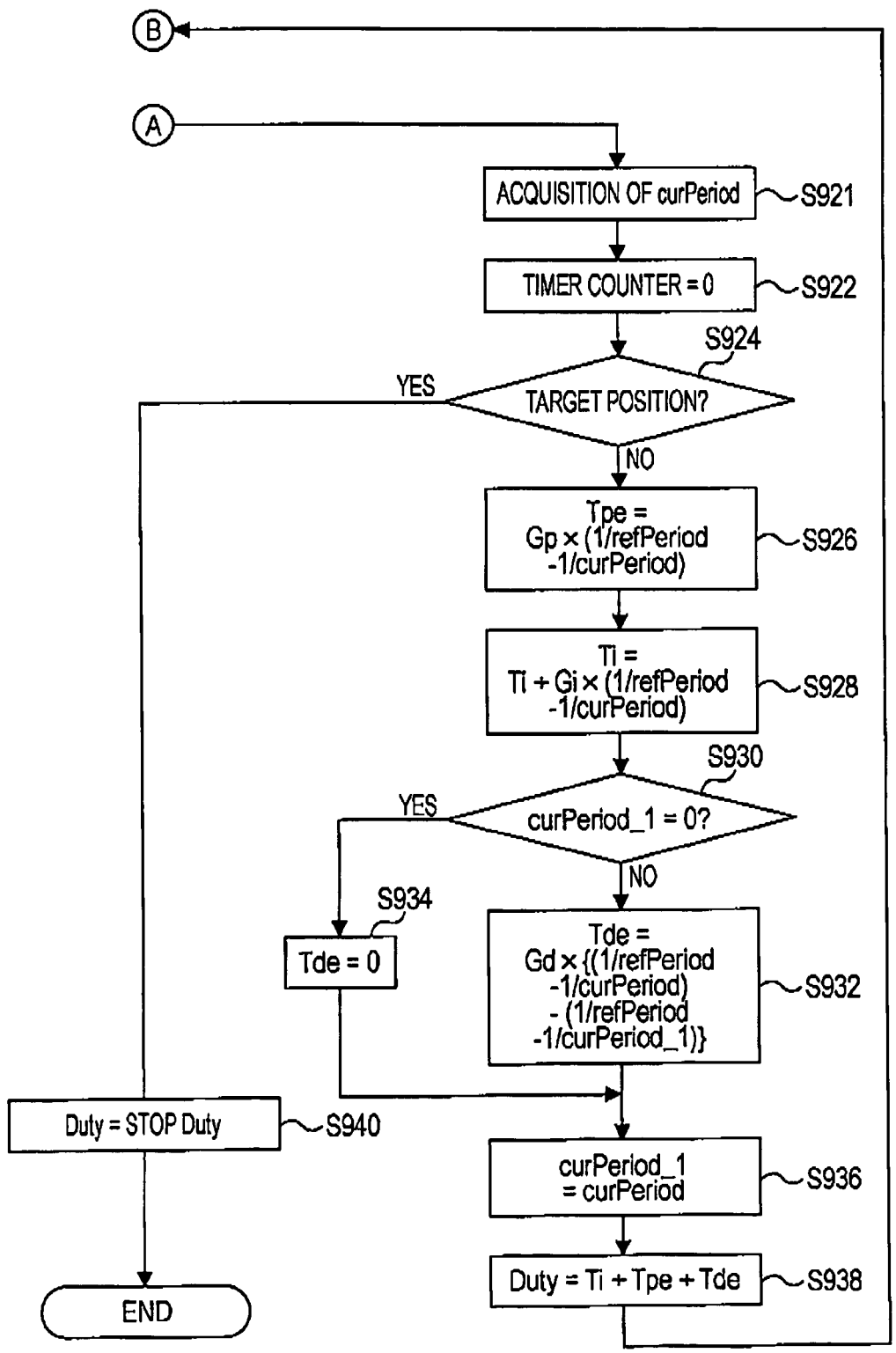
FIG. 9 is a flowchart (Part II) that schematically illustrates an example of the processing flow for controlling the rotation of the driving motor 22 of the scanner 10 according to an exemplary embodiment of the invention.

Controlling of Driving Motor 22 According to Exemplary Embodiment of the Invention FIG. 8 is a flowchart (Part I) that schematically illustrates an example of the processing flow for controlling the rotation of the driving motor 22 of the scanner 10 according to an exemplary embodiment of the invention. FIG. 9 is a flowchart (Part II) that schematically illustrates an example of the processing flow for controlling the rotation of the driving motor 22 of the scanner 10 according to an exemplary embodiment of the invention.

Herein, an integral, an encoder-interruption proportional, a differential (i.e., derivative), and a timer-interruption proportional are used in order to calculate duty, which is denoted as "Duty" in the illustration of the accompanying drawings as well as in the following description of this specification. As has already been explained above, the duty (Duty) indicates the controlling amount. In addition, in the illustration of the accompanying drawings as well as in the following description of this specification, the integral is denoted as "Ti", whereas the differential is denoted as "Tde". The encoder-interruption proportional, which is a proportional that is calculated on the basis of an encoder interruption, is represented as "Tpe", whereas the timer-interruption proportional, which is a proportional that is calculated on the basis of a timer interruption, is represented as "Tpt". A more detailed explanation of the integral Ti, the encoder-interruption proportional Tpe, the differential Tde, and the timer-interruption proportional Tpt will be given later. At the starting point of the processing flow described below, each value of the integral Ti, the encoder-interruption proportional Tpe, the differential Tde, and the timer-interruption proportional Tpt is set (i.e., has been reset) at zero.

As a first step of the processing flow illustrated in the flowchart of FIGS. 8 and 9, the controlling unit 60 resets the count value of a timer (which is denoted as "Timer" in the illustration of the accompanying drawings as well as in the following description of this specification) into zero. Then, in this first step S902, the controlling unit starts the operation of the Timer. The Timer is used for generating a timer interruption at each lapse of a predetermined time period after the generation of an encoder interruption, which is explained below.

As the next step thereof, the controlling unit 60 makes a judgment as to whether an encoder interruption has occurred or not (step S904). In the description of this specification, the term "encoder interruption" means an interruption that is generated at each time when either the rising edge or the falling edge of either the first pulse ENC_A or the second pulse ENC_B is detected. If the controlling unit 60 determines that an encoder interruption has not occurred yet, the process moves to the next step S906. If the controlling unit 60 judges that an encoder interruption has occurred, the process jumps to a step S921.

If the controlling unit 60 judges in the above-described decision step of S904 that an encoder interruption has occurred, it is possible to calculate the current rotation speed of the driving motor 22 on the basis of a time interval between the preceding encoder interruption and the current encoder interruption. In such a case, the process jumps to the step S921 in order to control the rotation speed of the driving motor 22 on the basis of the current rotation speed thereof that is calculated on the basis of the time interval between the preceding encoder interruption and the current encoder interruption. Note that a series of processing flow in the step S921 and subsequent steps is performed for controlling the rotation speed of the driving motor 22 on the basis of the current rotation speed thereof that is calculated on the basis of the time interval between the preceding encoder interruption and the current encoder interruption.

On the other hand, if the controlling unit 60 judges in the above-described decision step of S904 that an encoder interruption has not occurred yet, it is not possible to, calculate the current rotation speed of the driving motor 22 on the basis of a time interval between the preceding encoder interruption and a new encoder interruption. In such a case, the process moves to the next step S906 in order to control the rotation speed of the driving motor 22 with the addition of the timer-interruption proportional Tpt, which is found on the basis of the timer count value Cnt_t. A more detailed explanation thereof will be given later.

In the decision step of S906, the controlling unit 60 makes a judgment as to whether the length of time measured (i.e., counted) by the Timer is longer than a predetermined timer-interruption time period Intr_t or not. In the description of this specification, it is assumed that the predetermined timer-interruption time period Intr_t is set at 200 μs. Therefore, the process moves to the next step S908 if the length of time that has elapsed since the Timer was started is greater than the predetermined timer-interruption time period Intr_t of 200 μs, whereas the process returns to the preceding step S904 if the length of time that has elapsed since the Timer was started is not greater than the predetermined timer-interruption time period Intr_t of 200 μs. The reason why the controlling unit 60 judges whether the length of time measured by the Timer is longer than the predetermined timer-interruption time period Intr_t or not is that the aforementioned judgment on the occurrence of an encoder interruption is made in the cycle (i.e., minimum unit) of the timer-interruption time. Therefore, the occurrence of an encoder interruption is waited for a time period of 200 μs after the starting of the Timer. If there occurs an encoder interruption during this waiting time period of 200 μs, the controlling amount is calculated on the basis of the encoder-interruption proportional Tpe. On the other hand, if no encoder interruption is generated during this waiting time period of 200 μs, the controlling amount is calculated with the addition of the timer-interruption proportional Tpt, which is found on the basis of the timer count value Cnt_t.

When the process moves to the step S908, the controlling unit 60 increases the timer count value Cnt_t by one increment. Accordingly, at each time when no encoder interruption occurs during the waiting time period of 200 μs, that is, at each lapse of the waiting time period of 200 μs without the generation of any encoder interruption, the controlling unit 60 increases the timer count value Cnt_t by one increment (step S908).

In the next step, the controlling unit 60 calculates a current period, that is, a current time interval (step S910). The current time interval (current period) is denoted as "curPeriod" in the illustration of the accompanying drawings as well as in the following description of this specification. The term "current time interval" curPeriod means a time interval between the last encoder interruption and the current point in time. The current time interval curPeriod is expressed in the following formula.

$$curPeriod = Cnt\_t \times Intr\_t \times 4$$

As has already been explained above, a timer interruption occurs at each lapse of 200 μs. In the description of this specification, it is assumed that four encoder-interruption time intervals make up a (i.e., one) unit of time. Or, in other words, the pulse period (i.e., pulse cycle) T that is shown in FIG. 6A is taken as the base unit of time. A target cycle (i.e., reference period), which is denoted as "refPeriod" in the illustration of the accompanying drawings as well as in the following description of this specification, is also set at a value based on the pulse cycle (i.e., pulse period) T. The reference period (i.e., target cycle) refPeriod is used for the purpose of comparative judgment in the following step. In order to ensure compatibility with the pulse period T, the timer-interruption time period Intr_t is multiplied by four in the right-hand side of the above mathematical formula.

In the next step, the controlling unit 60 makes a judgment as to whether the value of the current time interval (i.e., current period) curPeriod is larger than that of the target cycle (i.e., reference period) refPeriod or not (step S912). The term "target cycle" refPeriod means the time interval of encoder interruptions that should occur under the condition that the driving motor 22 rotates at the target speed (e.g., reference speed, though not limited thereto). In the following description of this specification, the target cycle refPeriod, which indicates reference period, may be further reworded as "reference time interval" just for the purpose of improving parallelism without any other intention to limit the scope of the invention. Therefore, in this decision step of S912, the controlling unit 60 judges whether the current time interval curPeriod is longer than the reference time interval refPeriod or not.

If the controlling unit 60 judges in the step S912 that the value of the current time interval curPeriod is not larger than that of the reference time interval refPeriod, the value of the timer-interruption proportional Tpt, which is calculated on the basis of the count value of the Timer, is set at zero (step S914). The reason why the value of the timer-interruption proportional Tpt is set at zero is to ensure that it does not take any negative value. In this branch of the processing flow, considering the fact that the controlling unit 60 judged in the previous step that no encoder interruption has occurred, it is apparent that the rotation speed of the driving motor 22 is on the decrease. Since the rotation speed of the driving motor 22 is obviously on the decrease, it is necessary to set the value of the timer-interruption proportional Tpt, which is calculated on the basis of the count value of the Timer, at a positive value, which results in an increase in the controlling amount thereof, in order to increase the rotation speed thereof. For this reason, the value of the timer-interruption proportional Tpt is set at zero so as to ensure that it does not take any negative value.

On the other hand, if the controlling unit 60 judges in the step S912 that the value of the current time interval curPeriod is larger than that of the reference time interval refPeriod, the controlling unit 60 calculates the value of the timer-interruption proportional Tpt on the basis of the count value of the Timer in the next step S916. The timer-interruption proportional Tpt is expressed in the following formula.

$$Tpt = Gp \times (1/refPeriod - 1/curPeriod)$$

In the above mathematical formula, Gp is a gain that is used for calculating the proportional of the Duty, which is the controlling amount.

In the next step, the controlling unit 60 calculates the integral Ti of the Duty, which indicates the controlling amount (step S918). The integral Ti is expressed in the following formula.

$$Ti = Ti + Gi \times (1/refPeriod - 1/curPeriod)$$

In the above mathematical formula, Gi is a gain that is used for calculating the integral of the Duty, which is the controlling amount.

In the next step, the controlling unit 60 calculates the Duty, which indicates the controlling amount (step S920). The controlling amount Duty is calculated in accordance with the following formula.

$$Duty = Ti + Tpe + Tde + Tpt$$

In the above mathematical formula, Tde is the differential of the Duty, which is the controlling amount. A more detailed explanation of the differential Tde will be given later.

After the calculation of the Duty, the process returns to the initial step S902. The driving motor 22 is controlled in accordance with (i.e., by) the controlling amount Duty, which can be calculated as explained above. The controlling amount Duty, which can be calculated as above, is obtained in the form of a count value. In order to obtain a duty ratio (%) from the count value of the controlling amount Duty according to the present embodiment of the invention, the Duty count value is divided by a predetermined value. For example, it is possible to obtain a duty ratio in terms of percentage by dividing the Duty count value by 4.2. In this way, it is possible to obtain a duty ratio (%) for controlling the rotating operation of the driving motor 22.

Next, with reference to FIG. 9, an explanation is given of the other branch of the processing flow that applies when the controlling unit 60 judges in the aforementioned step S904 that an encoder interruption has occurred. If it is judged in the step S904 that an encoder interruption has occurred, the controlling unit 60 acquires the current time interval curPeriod (step S921). It should be noted that the current time interval curPeriod acquired in this step is a time interval between the preceding encoder interruption and the current (i.e., present) encoder interruption. That is, in this step S921, the controlling unit 60 acquires the current time interval curPeriod as a time interval between the preceding encoder interruption and the current encoder interruption because a new (i.e., current) encoder interruption has occurred in the judgment step of S904. Therefore, the acquisition method of the current time interval curPeriod used in this step S921, which is based on the new current encoder interruption, differs from the acquisition method of the current time interval curPeriod used in the aforementioned step S910, which is based on the timer interruption.

After the acquisition of the current time interval curPeriod, the controlling unit 60 resets the count value of the Timer to zero (step S922). The reason why the count value of the Timer is reset to zero is that it is necessary to start the Timer from zero at each occurrence of an encoder interruption.

In the next step, the controlling unit 60 makes a judgment as to whether the carriage 21 is at the target position or not (step S924). More specifically, the controlling unit 60 calculates the integral of the traveling speed of the carriage 21 so as to obtain the calculated position of the carriage 21. Then, the controlling unit 60 makes a judgment as to whether the calculated position of the carriage 21 falls within a predetermined target range or not. As a result thereof, the controlling unit 60 judges whether the carriage 21 is at the target position or not in this step S924.

If it is judged that the carriage 21 is at the target position, a stop duty is set for the Duty (step S940). After the setting of the stop duty, the processing flow ends. On the other hand, if it is judged that the carriage 21 is not at the target position, the process moves to the next step S926.

In the step S926, the controlling unit 60 calculates the encoder-interruption proportional Tpe, which is a proportional that is calculated on the basis of an encoder interruption. The encoder-interruption proportional Tpe of the Duty is expressed in the following formula.

$$Tpe = Gp \times (1/refPeriod - 1/curPeriod)$$

Although the right-hand side of the above mathematical formula is the same as that of the aforementioned mathematical formula that is used for calculating the timer-interruption proportional Tpt, the acquisition method of the current time interval curPeriod used in this branch of the processing flow, which is based on the new current encoder interruption, differs from the acquisition method of the current time interval curPeriod used in the aforementioned branch of the processing flow, which is based on the timer interruption. For this reason, the value of the encoder-interruption proportional Tpe that is obtained in this branch of the processing flow, which is based on the new current encoder interruption, differs from the value of the timer-interruption proportional Tpt that is obtained in the aforementioned branch of the processing flow, which is based on the timer interruption.

In the next step S928, the controlling unit 60 calculates the integral Ti of the Duty. The integral Ti is expressed in the following formula.

$$Ti = Ti + Gi \times (1/refPeriod - 1/curPeriod)$$

Although the mathematical formula that is used for the calculation of the integral Ti in this step S928 is the same as that of the aforementioned step S918, the acquisition method of the current time interval curPeriod used in this branch of the processing flow, which is based on the new current encoder interruption, differs from the acquisition method of the current time interval curPeriod used in the aforementioned branch of the processing flow, which is based on the timer interruption. For this reason, the value of the integral Ti that is obtained in this branch of the processing flow (step S928), which is based on the new current encoder interruption, differs from the value of the integral Ti that is obtained in the aforementioned branch of the processing flow (step S918), which is based on the timer interruption.

In the next step, the controlling unit 60 makes a judgment as to whether the preceding current time interval, which is denoted as "curPeriod_1" in the illustration of the accompanying drawings as well as in the following description of this specification, is zero or not (step S930). If it is judged in the step S930 that the preceding current time interval curPeriod_1 is zero, the controlling unit 60 sets the differential Tde of the Duty at zero (step S934). On the other hand, if it is judged in the step S930 that the preceding current time interval curPeriod_1 is not zero, the controlling unit 60 calculates the encoder-interruption differential Tde, which is a differential that is calculated on the basis of an encoder interruption, in accordance with the following formula.

$$Tde = Gd \times [(1/refPeriod - 1/curPeriod) - (1/refPeriod - 1/curPeriod\_1)]$$

In the above mathematical formula, Gd is a gain that is used for calculating the differential of the Duty, which is the controlling amount.

In the next step, the controlling unit 60 sets the current time interval curPeriod on the basis of (i.e., as) the preceding current time interval curPeriod_1 (step S936).

In the next step, the controlling unit 60 calculates the controlling amount Duty in accordance with the following formula (step S938).

$$Duty = Ti + Tpe + Tde$$

After the calculation of the Duty, the process returns to the initial step S902. The controlling amount Duty is calculated as explained above. Then, on the basis of the calculated Duty, the rotating operation of the driving motor 22 is controlled.

Figure 10:
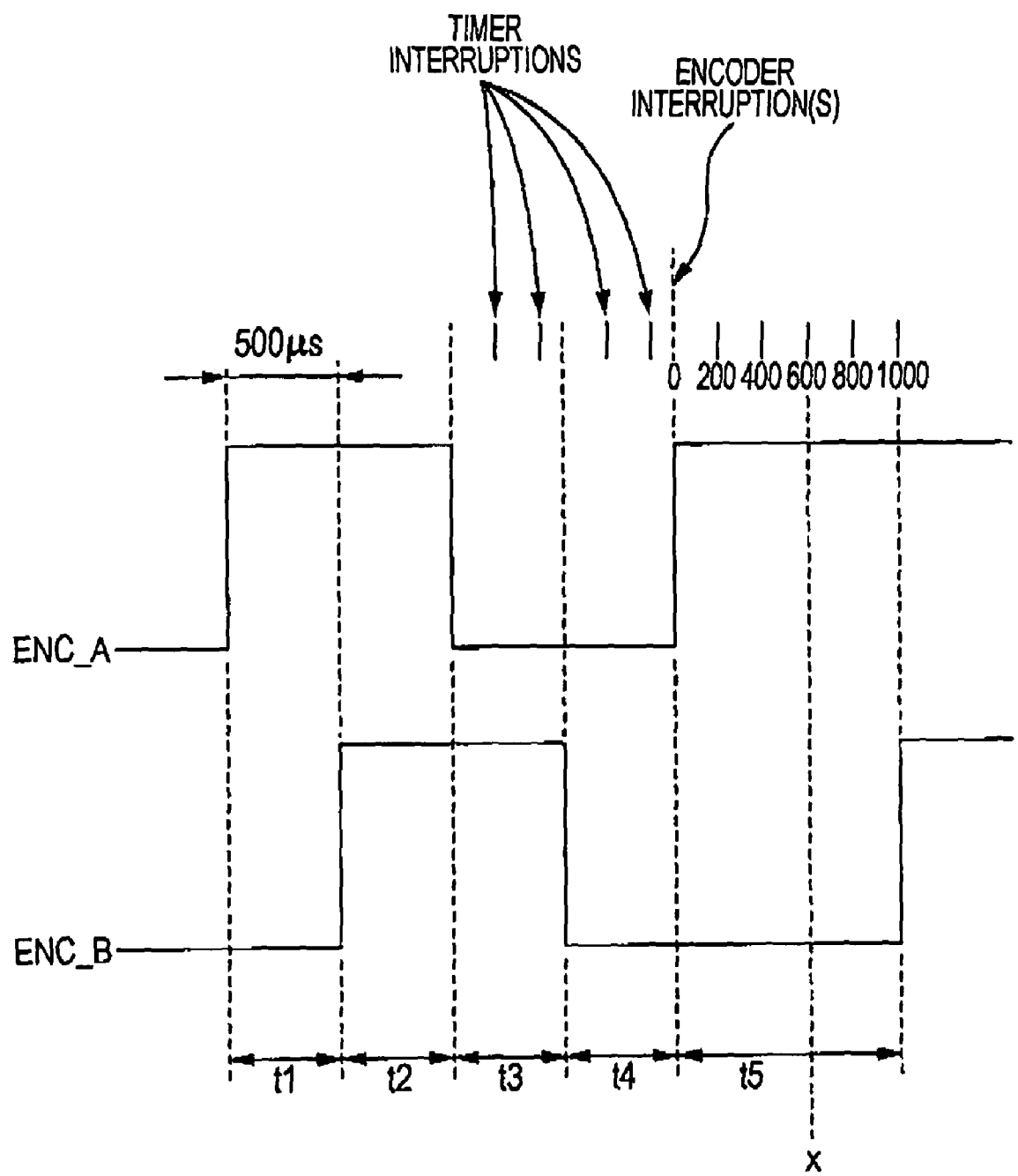
FIG. 10 is a timing chart that schematically illustrates an example of the timing relationship between encoder interruptions and timer interruptions according to an exemplary embodiment of the invention.

FIG. 10 is a timing chart that schematically illustrates an example of the timing relationship between encoder interruptions and timer interruptions according to an exemplary embodiment of the invention. In the following description, the relationship between the timing of occurrences of encoder interruptions and the timing of occurrences of timer interruptions under the unique control flow of the present embodiment of the invention described above is explained. In addition, it is further explained below as to how the controlling amount thereof is determined. Note that the number shown in each pair of parentheses in the following description of this specification indicates the corresponding step number of the above-explained processing flow of the present embodiment of the invention.

The aforementioned first pulse ENC_A and the aforementioned second pulse ENC_B are shown in FIG. 10. Herein, it is assumed that the actual rotation speed of the driving motor 22 is decreasing. Specifically, the length of each of the time period t1, t2, t3, and t4 is 500 μs, whereas the time interval of the period t5 is larger than that of each of the period t1, t2, t3, and t4.

Timing of encoder interruptions is shown in FIG. 10. An encoder interruption is generated at each time when either the rising edge or the falling edge of either the first pulse ENC_A or the second pulse ENC_B is detected. In order to simplify illustration, however, only one encoder interruption is shown with the legend of "ENCODER INTERRUPTION" therein.

Timing of timer interruptions is also shown in FIG. 10. As has already been explained earlier, a timer interruption occurs at each lapse of 200 μs after the occurrence of an encoder interruption. That is, a timer interruption occurs at each time when the time period of 200 μs elapses; wherein, the first time period of 200 μs thereof starts at each rising/falling of either pulse. The accumulated amount of time that has elapsed since a certain encoder interruption occurred is calculated on the basis of the number of timer interruptions that have occurred since the above-mentioned occurrence of the encoder interruption. The same holds true for each encoder interruption.

In the illustrated timing chart of FIG. 10, it is assumed that the reference time interval refPeriod, that is, the aforementioned target cycle or the reference period, is set at 500 μs. Although the accumulated length of time counted (i.e., measured) by the Timer could become longer than the predetermined timer-interruption time period Intr_t of 200 μs in each of the time period t1, t2, t3, and t4 (step S906), time that has elapsed after the occurrence of the corresponding encoder interruption, that is, the current time interval curPeriod, never exceeds the reference time interval refPeriod in each of the time period t1, t2, t3, and t4 (step S912). Since the current time interval curPeriod is shorter than the reference time interval refPeriod, the value of the timer-interruption proportional Tpt is set at zero in each of the time period t1, t2, t3, and t4 (step S914). This means that there is not any substantial addition of the timer-interruption proportional Tpt in the calculation of the controlling amount Duty.

In contrast, time that has elapsed after the occurrence of the encoder interruption, that is, the current time interval curPeriod, could exceed the reference time interval refPeriod during the time period t5. More specifically, the controlling unit 60 judges that the value of the current time interval curPeriod is larger than that of the reference time interval refPeriod at the point X in time (step S912), which is 600 μs after the occurrence of the encoder interruption. Since it is judged in the step S912 that the value of the current time interval curPeriod is larger than that of the reference time interval refPeriod, the controlling unit 60 calculates the value of the timer-interruption proportional Tpt on the basis of the count value of the Timer in order to increase the controlling amount (step S916). In addition, the controlling unit 60 calculates the integral Ti of the Duty with the use of (i.e., on the basis of) the current time interval curPeriod that is calculated on the basis of the timer interruption (step S918).

As explained above, since the value of the timer-interruption proportional Tpt is calculated on the basis of the count value of the Timer and further since the value of the integral Ti is calculated with the use of the current time interval curPeriod that is calculated on the basis of the timer interruption, the controlling amount is substantially increased. The next encoder interruption occurs after the lapse of 1,000 μs, which is counted from the start of the time period t5. As a result of the occurrence of the next encoder interruption, the count value of the Timer is reset to zero (step S922). Then, the controlling unit 60 calculates the controlling amount Duty in accordance with the formula that does not include the timer-interruption proportional Tpt (step S938). That is, the driving motor 22 is controlled without the addition of the timer-interruption proportional Tpt.

Figure 11:
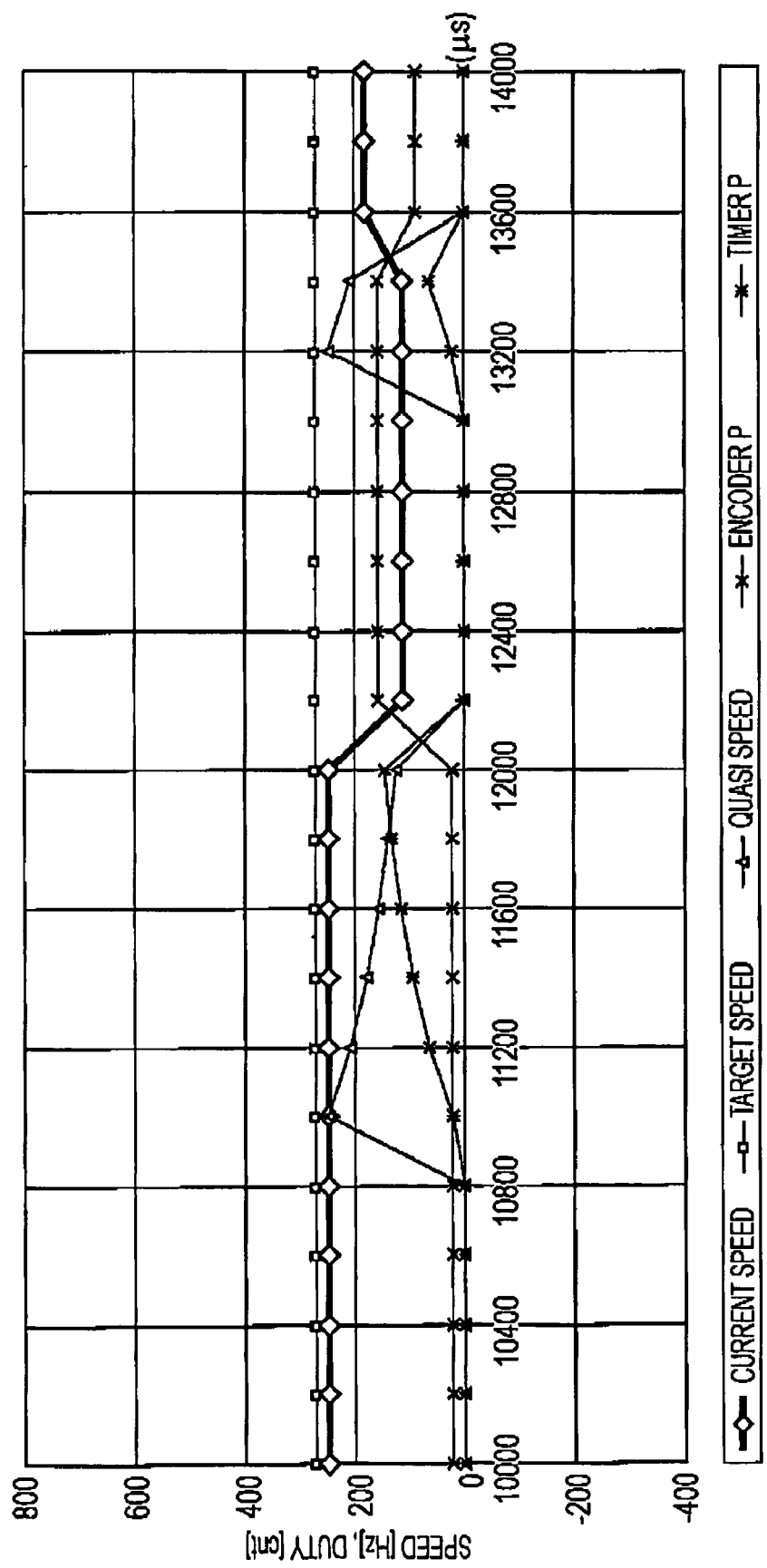
FIG. 11 is a graph that schematically illustrates an example of output variation according to an exemplary embodiment of the invention.

FIG. 11 is a graph that schematically illustrates an example of output variation according to an exemplary embodiment of the invention. FIG. 11 shows the current speed, the target speed (e.g., reference speed), and a quasi speed (e.g., false speed, simulated speed, or pseudo velocity, though not limited thereto). In addition thereto, FIG. 11 shows an encoder P and a timer P. The horizontal axis of FIG. 11 represents time. Specifically, the time range from 10,000 μs to 14,000 μs is shown therein. The vertical axis of FIG. 11 represents speed as well as the controlling amount Duty. Note that the number shown in each pair of parentheses in the following description of this specification indicates the corresponding time.

The current speed is the reciprocal, that is, inverse number, of a time interval between the last encoder interruption and the second last encoder interruption. In the illustrated example, the rotation speed is expressed in terms of hertz. One hertz corresponds to the movement of each one slit of the rotary disc 564 of the rotary encoder 51 through the detecting unit 566 thereof in one second. As has already been explained earlier, four hundred and forty-eight slits are formed in the rotary disc 564. Therefore, if the operation speed thereof is 448 Hz, it means that the driving motor 22 spins 360° (i.e., one rotation) in one second.

The target speed is the inverse number of the aforementioned reference time interval (i.e., reference period or target cycle) refPeriod. The target speed is also expressed in hertz in order to ensure compatibility with the current speed. The quasi speed is the inverse number of the current time interval curPeriod that is acquired on the basis of the count value of the Timer in the aforementioned step S910.

The encoder P is the value of the encoder-interruption proportional Tpe of the Duty. As has already been explained above, the encoder-interruption proportional Tpe is calculated on the basis of the encoder interruption. The timer P is the value of the timer-interruption proportional Tpt of the Duty. As has already been explained above, the timer-interruption proportional Tpt is calculated on the basis of the timer interruption.

Herein, it is assumed that no encoder interruption occurs during the time range from 10,000 μs to 12,000 μs. In this range of time from 10,000 μs to 12,000 μs, although a speed that is calculated on the basis of a time interval between the last two encoder interruptions is shown therein as the current rotation speed of the driving motor 22, the actual rotation speed of the driving motor 22 is slower than the speed calculated on the basis of the time interval between the last two encoder interruptions because the actual rotation speed of the driving motor 22 is on the decrease. When the actual rotation speed of the driving motor 22 continues to be slower than the speed calculated on the basis of the time interval between these two preceding encoder interruptions without any new encoder interruption, the counting of the Timer is initiated. As a result of the start of the timer count, the value of the quasi speed, which is the reciprocal of the current time interval curPeriod that is acquired on the basis of the count value of the Timer in the aforementioned step S910, increases. Under the condition that the value of the quasi speed is large, the value of 1/curPeriod is also large when the controlling unit 60 calculates the value of the timer-interruption proportional Tpt in the aforementioned step S916. Accordingly, the value of the timer-interruption proportional Tpt, which is calculated on the basis of the timer interruption, is small. That is, at this point in time (11,000 μs) where the quasi speed is large, since the value of 1/curPeriod is also large, the value of the timer-interruption proportional Tpt, that is, the value of the timer P, is still small. However, as the value of current time interval curPeriod increases, which means that the value of 1/curPeriod decreases, the value of the timer-interruption proportional Tpt, which is calculated on the basis of the timer interruption, increases gradually (11,000-12,000 es). That is, at the range of time from 11,000 μs to 12,000 is, the value of the timer P is on the increase. As explained above, the controlling amount is calculated with the addition of the timer P (i.e., timer-interruption proportional Tpt), which is found on the basis of the timer count value Cnt_t, if no encoder interruption is generated during a predetermined waiting time period. Therefore, it is possible to avoid the rotation of the driving motor 22 from being stopped completely. More specifically, an encoder interruption occurs successfully at the point in time 12,000 μs. For this reason, the current speed changes at the point in time 12,000 μs.

Since an encoder interruption occurs at the point in time 12,000 μs, it is possible to calculate the current rotation speed of the driving motor 22 on the basis of a time interval between the preceding encoder interruption and the current encoder interruption. Therefore, despite the fact that the actual rotation speed thereof changes momentarily, the current speed at the point in time 12,200 μs reflects the most accurate speed thereof at this moment (i.e., at this point in time).

Since the current speed becomes lower at the point in time 12,200 μs, a difference (e.g., deviation, though not limited thereto) between the target speed and the current speed increases. Accordingly, the encoder-interruption proportional Tpe, which is calculated on the basis of the encoder interruption, takes a large value (12,200-13,400 μs). That is, at the range of time from 12,200 μs to 13,400 μs, the value of the encoder P is large.

Although the value of the encoder P has increased, there occurs no encoder interruption for a certain time period (12, 200-13,600 μs). Therefore, the value of the quasi speed, which is the reciprocal of the current time interval curPeriod that is acquired on the basis of the count value of the Timer in the aforementioned step S910, increases (13,200 μs). Thereafter, the value of the quasi speed gradually decreases (13,400 μs). As the value of the quasi speed gradually decreases, the value of the timer-interruption proportional Tpt, which is calculated on the basis of the timer interruption and corresponds to the value of the timer P, increases gradually. As a consequence of the increase of the timer-interruption proportional Tpt, the Duty also increases, which results in the occurrence of an encoder interruption again (13,600 μs). Since an encoder interruption occurs again at the point in time 13,600 μs, it is possible to calculate the current rotation speed of the driving motor 22 on the basis of a time interval between the preceding encoder interruption and the current encoder interruption. For this reason, the current speed changes at the point in time 13,600 μs. Since the current speed becomes closer to the target speed at the point in time 13,600 μs, or, in other words, since a difference between the target speed and the current speed becomes smaller thereat, the encoder-interruption proportional Tpe, which is calculated on the basis of the encoder interruption, takes a smaller value than before (13,600-14,000 μs). That is, at the range of time from 13,600 μs to 14,000 μs, the value of the encoder P takes a smaller value than before.

As explained above, in the unique controlling of the rotation of the driving motor 22 according to the present embodiment of the invention, the amount of control is increased if there occurs no encoder interruption for a certain time period. The driving motor 22 is rotated with the increased control amount under such a condition. By this means, it is possible to adequately control the rotation of the driving motor 22 while avoiding the driving motor 22 from being stopped.

Note that the above-mentioned condition in which no encoder interruption occurs for a certain time period corresponds to the motor-speed-reduction time period during which the rotation speed of the driving motor 22 is on the decrease. Under such a condition, the driving motor 22 is operated with the increased controlling amount. Therefore, if the unique controlling of the driving motor 22 according to the present embodiment of the invention is adopted, it is possible to adequately control the rotation of the driving motor 22 while avoiding any excessive reduction in the rotation speed thereof.

The scanner 10 according to the present embodiment of the invention starts its reading operation for the next line of pixels that are aligned in the main-scan direction only after both of the following two conditions are satisfied; (1) the movement of the image sensor 41 for the reading of the current line (one line) of pixels that are aligned in the main-scan direction has finished; and (2) a predetermined reference time has elapsed. Note that the term "next line of pixels" used in the first sentence of this paragraph means one line of pixels that should be scanned after the completion of the reading of the current line of pixels when the scanning operation is performed in a sequential "line-by-line" order along the sub-scan direction.

More specifically, the scanner 10 according to the present embodiment of the invention performs-scanning as follows. If the movement of the image sensor 41 for the reading of the current line of pixels arrayed along the main-scan direction has finished before a predetermined reference time elapses, the scanner 10 waits until the predetermined reference time elapses. Then, electric charges that have accumulated through the process of photoelectric conversion in the corresponding pixels of the linear CCD sensor are transferred. In this way, only after the completion of the reading of the current line of pixels that are aligned in the main-scan direction and further after the lapse of the predetermined reference time, the scanner 10 starts the reading operation for the next line of pixels that are aligned in the main-scan direction, where the term next line of pixels means, as defined above, one line of pixels that should be scanned after the completion of the reading of the current line of pixels when the scanning operation is performed in a sequential line-by-line order along the sub-scan direction.

On the other hand, if the movement of the image sensor 41 for the reading of the current line of pixels arrayed along the main-scan direction has finished after the lapse of the predetermined reference time, electric charges that have accumulated through the process of photoelectric conversion in the corresponding pixels of the linear CCD sensor are transferred after the lapse of a certain time period that is longer than the predetermined reference time. In such a case, since electric charges have accumulated throughout the above-mentioned certain time period that is longer than the predetermined reference time, the amount of accumulated electric charges is larger than a desired amount thereof. If the amount of accumulated electric charges is larger than a desired amount thereof because of longer accumulation time as explained above, irregular color, which is unevenness in color such as color shading or the like, could be observed at the pixel line or in the neighborhood thereof. In order to ensure that electric charges are acquired through photoelectric conversion that is performed for adequate length of time for each pixel before transfer thereof, it is necessary to set the length of the predetermined reference time at such a value that the predetermined reference time elapses after the movement of the image sensor 41 for the reading of one line of pixels arrayed along the main-scan direction has finished.

Figure 12:
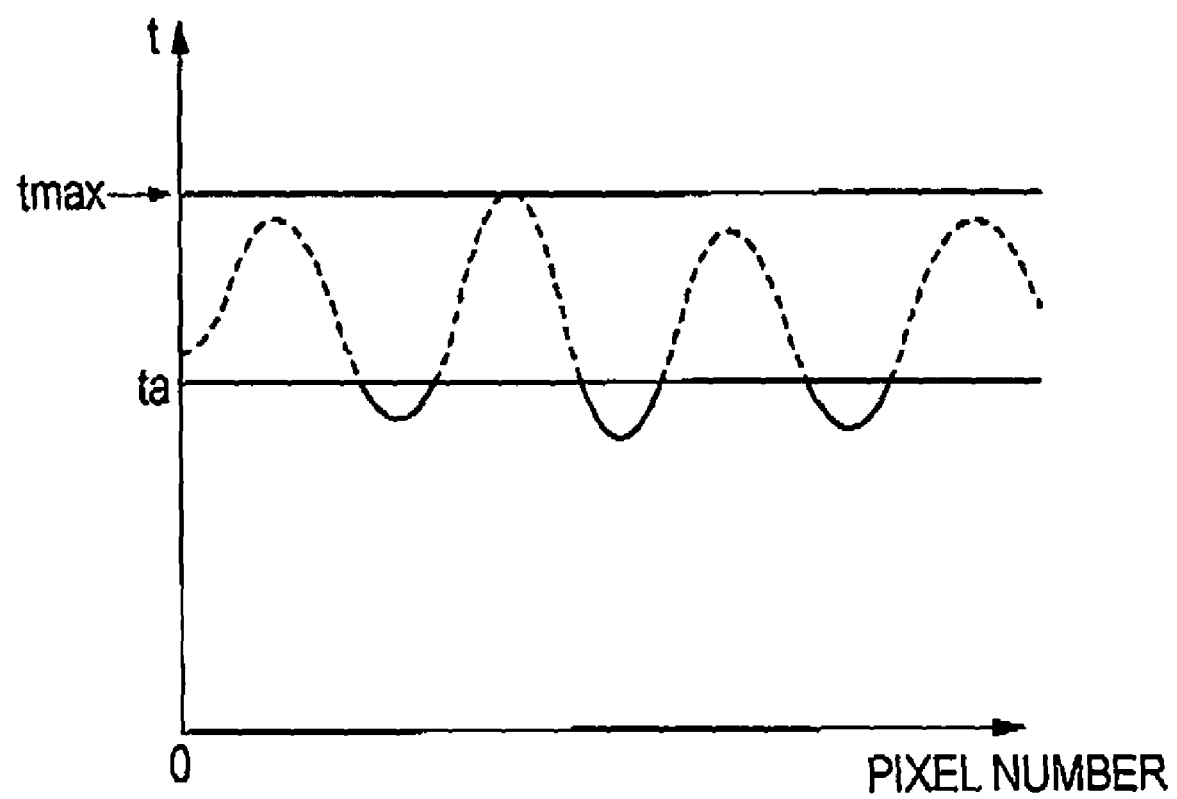
FIG. 12 is a graph that schematically shows an example of a method for determining the length of a predetermined reference time according to an exemplary embodiment of the invention.

FIG. 12 is a graph that schematically shows an example of a method for determining the length of a predetermined reference time according to an exemplary embodiment of the invention. The horizontal axis of FIG. 12 represents "sub-scan" pixel number (e.g., n-th line) that is counted from the reference position along the sub-scan direction. The vertical axis of FIG. 12 represents time that is required for the movement of the image sensor 41 for each one sub-scan pixel. In the following description of this specification, the above-mentioned time taken for the movement of the image sensor 41 for each one sub-scan pixel is referred to as "sensor drive time" or is expressed as an equivalent thereto. As shown in the drawing, the sensor drive time is shown in the form of a curve, which indicates that the sensor drive time differs from one sub-scan pixel to another. This is because the above-mentioned time taken for the movement of the image sensor 41 varies from one sub-scan pixel to another.

It is assumed herein for the purpose of explanation that the predetermined reference time is set at $t_a$ shown in FIG. 12. The solid line portion of the curve shown in FIG. 12 indicates that the movement of the image sensor 41 for one sub-scan pixel has been completed before the predetermined reference time elapses. In such a case, photoelectric conversion is performed for the predetermined reference time, which encompasses the movement of the image sensor 41 for the above-mentioned one sub-scan pixel. Then, the accumulated electric charges are transferred. Therefore, in this case, that is, in this solid line portion of the curve, proper amount of electric charges, which is in accordance with the predetermined reference time, are transferred.

On the other hand, the broken line portion of the curve shown in FIG. 12 indicates that the movement of the image sensor 41 for one sub-scan pixel has not been completed yet at the point in time at which the predetermined reference time has elapsed. Therefore, photoelectric conversion is continued thereat. Since photoelectric conversion is continued until the movement of the image sensor 41 for one sub-scan pixel finishes, the accumulated amount of electric charges is larger than a desired amount corresponding to the predetermined reference time.

In order to overcome such a problem, it is necessary to set the length of the predetermined reference time at such a value that the predetermined reference time elapses after the movement of the image sensor 41 for the reading of "each" one sub-scan pixel has finished. That is, it is necessary to set the length of the predetermined reference time at a value larger than that of the above-mentioned time taken for the movement of the image sensor 41 for each one sub-scan pixel (i.e., sensor drive time). More specifically, in order to overcome such a problem, it is necessary to set the predetermined reference time at the maximum sensor drive time $t_{max}$ or greater. In this respect, in the configuration of the scanner 10 according to the present embodiment of the invention, the predetermined reference time is set at the maximum sensor drive time $t_{max}$ or even larger. Accordingly, the predetermined reference time is longer than the above-mentioned time taken for the movement of the image sensor 41 for each one sub-scan pixel.

As the predetermined reference time becomes longer, so does time required for reading each one sub-scan pixel, that is, time required for reading each one main-scan line. Accordingly, the overall reading speed decreases, which is not desirable. Moreover, if time required for reading each one sub-scan pixel is too long, acquired data might contain noise. In view of the foregoing, it is preferable to lower the maximum sensor drive time $t_{max}$ so as to shorten time that is required for reading each one sub-scan pixel.

If the unique controlling according to the present embodiment of the invention is adopted for the movement of the image sensor 41 for the reading of each pixel, since it is possible to adequately control the rotation of the driving motor 22 while avoiding any excessive reduction in the rotation speed thereof, time required for reading each pixel is shortened. Thus, it is possible to lower the maximum sensor drive time $t_{max}$, which results in a favorable shortening of the predetermined reference time.

Figure 13:
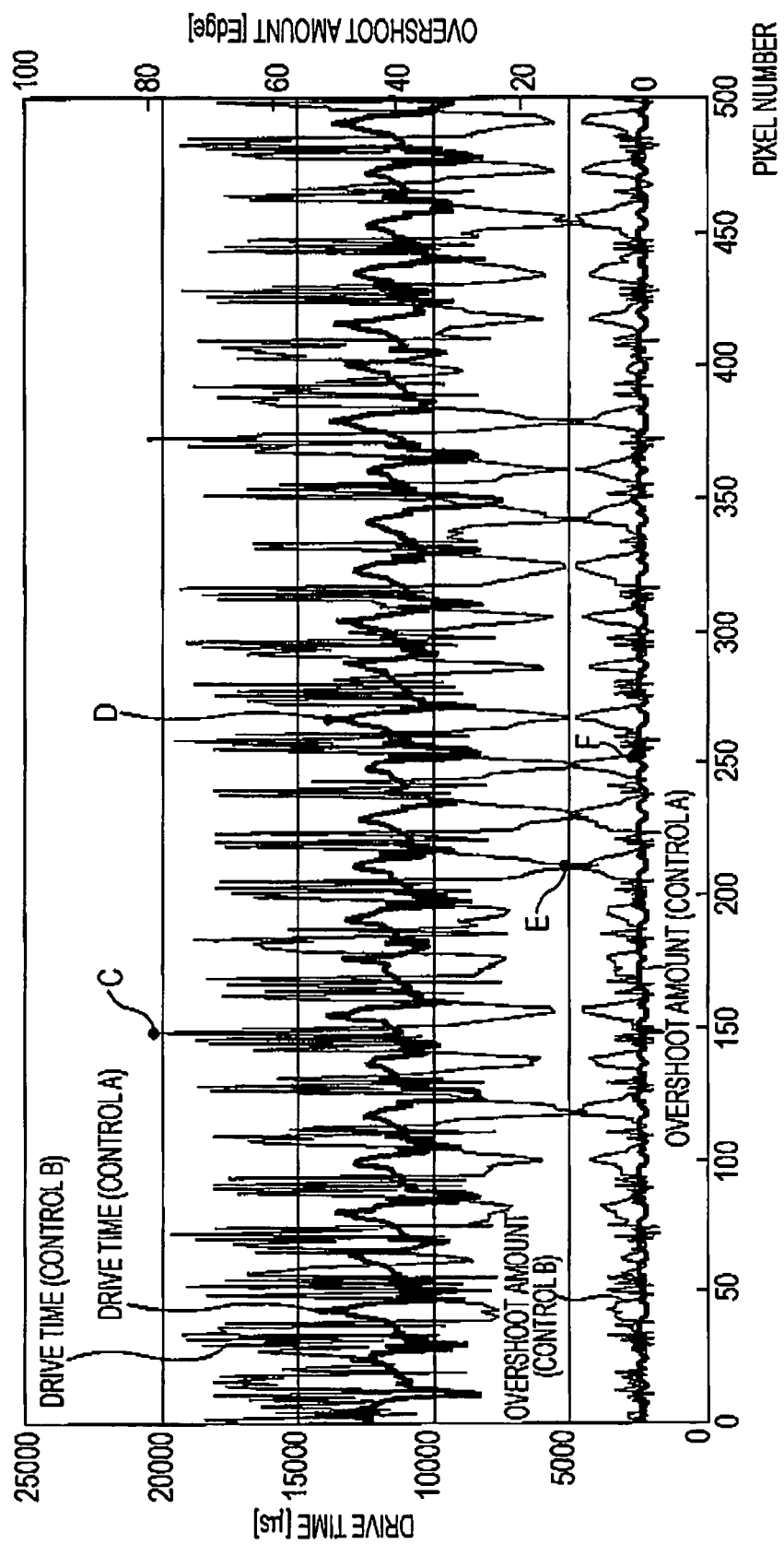
FIG. 13 is a diagram that schematically illustrates an example of sensor drive time, that is, time taken for the movement of an image sensor 41 for each one sub-scan pixel according to an exemplary embodiment of the invention; in addition, FIG. 13 further shows overshoot amount.

FIG. 13 is a diagram that schematically illustrates an example of sensor drive time, that is, time taken for the movement of the image sensor 41 for each one sub-scan pixel according to an exemplary embodiment of the invention; in addition, FIG. 13 further shows overshoot amount. The horizontal axis of FIG. 13 represents pixel number. The vertical axis thereof shows sensor drive time and overshoot amount. In FIG. 13, sensor drive time under control according to the present embodiment of the invention is shown with a thick line. In the illustration of this drawing as well as in the following description of this specification, the control according to the present embodiment of the invention is denoted as "control A". On the other hand, sensor drive time under control of the related art is shown with a thin line in FIG. 13. In the illustration of this drawing as well as in the following description of this specification, the control of the related art is denoted as "control B". In addition, overshoot amount under the control A (i.e., present embodiment of the invention) is shown with a thick line in FIG. 13, whereas overshoot amount under the control B (i.e., related art) is shown with a thin line therein.

The overshoot amount described herein is expressed in the number of edges of pulses outputted from the aforementioned rotary encoder 51. The scanner 10 is set so that the image sensor 41 travels the distance of 1,200 dpi in the sub-scan direction at the detection of sixteen edges of pulses outputted from the rotary encoder 51.

As shown in FIG. 13, although the sensor drive time under the control B (i.e., related art) is shorter than the sensor drive time under the control A (i.e., present embodiment of the invention) at some pixels, the sensor drive time under the control B is longer than the sensor drive time under the control A at other pixels. The maximum sensor drive time $t_{max}$ under the control B is 21,000 µs at the point C shown in the drawing. On the other hand, the maximum sensor drive time $t_{max}$ under the control A is 14000 is at the point D shown in the drawing.

As has already been explained above, if the unique controlling (i.e., control A) according to the present embodiment of the invention is adopted for the movement of the image sensor 41 for the reading of each pixel, it is possible to adequately control the rotation of the driving motor 22 while avoiding any excessive reduction in the rotation speed thereof. Consequently, it is possible to move the image sensor 41 at a more constant speed. Therefore, the maximum sensor drive time $t_{max}$ under the control A is shorter than the maximum sensor drive time $t_{max}$ under the control B. For this reason, if the control A is used, it is possible to set a shorter predetermined reference time. Thus, if the control A is used, it is possible to improve the moving speed of the image sensor 41 of the scanner 10.

As shown in FIG. 13, the overshoot amount under the control B is large where the sensor drive time is short. More specifically, the maximum overshoot amount under the control B is thirteen edges at the point E shown therein. The likely cause of such a large overshoot amount is that the sensor drive time under the control B has a large fluctuation. That is, since the sensor drive time under the control B fluctuates greatly from one sub-scan pixel to another, it is most likely that a controlling unit, which is responsible for performing the control B, fails to perform adequate control when the image sensor 41 moves at a high speed.

In contrast, in a case where the unique control A according to the present embodiment of the invention is used for the movement of the image sensor 41 for the reading of each pixel, overall overshoot amount is relatively small. More specifically, the maximum overshoot amount under the control A is two edges at the point F shown therein. That is, if the unique control A according to the present embodiment of the invention is used for the movement of the image sensor 41 for the reading of each pixel, it is possible to reduce fluctuations in sensor drive time. Thus, it is possible to achieve smaller overshoot amount. Therefore, it is possible to move the image sensor 41 without any necessity to lengthen the sensor drive time for the purpose of reducing overshoot amount. In other words, it is possible to move the image sensor 41 without any necessity to decrease the movement speed thereof for the purpose of reducing overshoot amount.

As explained above, if the unique controlling according to the present embodiment of the invention is used for the movement of the image sensor 41 for the reading of each pixel, it is possible to move the image sensor 41 at a more constant speed. Thus, it is possible to set a shorter predetermined reference time and to improve the moving speed of the image sensor 41. In addition, if the unique controlling according to the present embodiment of the invention is used for the movement of the image sensor 41 for the reading of each pixel, it is possible to reduce fluctuations in sensor drive time and thus to achieve smaller overshoot amount.

Other Embodiments

Although the present invention is explained above while discussing an exemplary embodiment thereof, the specific embodiment described above is provided solely for the purpose of facilitating the understanding of the invention. The above explanatory embodiment should in no case be interpreted to limit the scope of the invention. Needless to say, the invention may be modified, altered, changed, adapted, and/or improved within a range not departing from the gist and/or spirit of the invention apprehended by a person skilled in the art from explicit and implicit description made herein, where such a modification, an alteration, a change, an adaptation, and/or an improvement is also covered by the scope of the appended claims. It is the intention of the inventor/applicant that the scope of the invention covers any equivalents thereof without departing therefrom. In particular, it is intended that the following specific variation of the embodiment should also fall within the scope of the invention.

Although the unique technique according to the present embodiment of the invention is applied to the controlling of a motor that is used for moving the carriage of a scanner in the foregoing explanation, the above-explained technique may be applied to the controlling of a motor that is used for moving the carriage of an ink-jet printer, which forms an image on a sheet of printing paper as a result of the discharging (i.e., ejection) of ink drops thereon.

In the foregoing description of an exemplary embodiment of the invention, it is explained that the rotary disc 564 of the rotary encoder 51 is fixed to the motor-power-output axis of the driving motor 22. However, the scope of the invention is not limited to such an exemplary configuration. As a non-limiting modification example thereof, the rotary disc 564 of the rotary encoder 51 may be fixed to the shaft 24. In the foregoing description of an exemplary embodiment of the invention, it is explained that the rotary encoder 51 is used for detecting the rotation speed of the driving motor 22. However, the scope of the invention is not limited to such an exemplary configuration. As a non-limiting modification example thereof, a linear encoder may be used in place of the rotary encoder 51. In such a modified configuration, the linear encoder detects the traveling speed of a carriage, which moves together with a belt to which the carriage is attached.

The entire disclosure of Japanese Patent Application Nos: 2007-208407, filed Aug. 9, 2007 and 2008-166313, filed Jun. 25, 2008 are expressly incorporated by reference herein.

What is claimed is:

1. A scanner, comprising:
    a speed calculating section that calculates a speed related to the rotation of a motor on the basis of a signal that is outputted from an encoder; and
    a controlling section that calculates control amount on the basis of the speed calculated by the speed calculating section so as to control the rotation of the motor in accordance with the calculated control amount, the controlling section controlling the motor with an increase in the control amount in a case where there occurs no change in the signal that is outputted from the encoder for a certain period of time, the increase in the control amount being based on the length of time that has elapsed since the last change in the signal.

2. The scanner according to claim 1, wherein the control amount is relatively large when the time that has elapsed since the last change in the signal is relatively long in comparison with a control amount that will be obtained when the time that has elapsed since the last change in the signal is relatively short.

3. The scanner according to claim 1, wherein, if a time interval of changes in the signal under the condition that the speed related to the rotation of the motor reaches and/or is at a target speed is defined as a reference time interval, the increase in the control amount includes such an amount that is in proportion to a value obtained by subtracting the inverse number of the elapsed time from the inverse number of the reference time interval.

4. The scanner according to claim 1, wherein the speed related to the rotation of the motor is calculated on the basis of the time interval of the last change in the signal.

5. The scanner according to claim 1, wherein the controlling section performs PID control on the basis of the speed related to the rotation of the motor so as to control the rotation of the motor in a case where there occurs a change in the signal that is outputted from the encoder in the above-mentioned certain period of time, whereas the controlling section increases the control amount with the addition of another control amount on the basis of the elapsed time to a PID control amount that is based on the speed related to the rotation of the motor in a case where there occurs no change in the signal that is outputted from the encoder for the above-mentioned certain period of time.

6. The scanner according to claim 5, wherein, in a case where there occurs no change in the signal that is outputted from the encoder for the above-mentioned certain period of time, an integral, which is one component of the PID control amount, is calculated on the basis of the elapsed time.

7. The scanner according to claim 1, wherein the above-mentioned change in the signal that is outputted from the encoder is either the rising of a pulse that is outputted from the encoder or the falling of a pulse that is outputted from the encoder.

8. The scanner according to claim 1, wherein the speed calculating section calculates the speed related to the rotation of the motor on the basis of a time interval between the rising or the falling of one encoder output pulse and the rising or the falling of the other encoder output pulse.

9. An scanner controlling method, comprising:
calculating a speed related to the rotation of a motor on the basis of a signal that is outputted from an encoder; and
calculating control amount on the basis of the speed calculated so as to control the rotation of the motor in accordance with the calculated control amount, and then controlling the motor with an increase in the control amount in a case where there occurs no change in the signal that is outputted from the encoder for a certain period of time, the increase in the control amount being based on the length of time that has elapsed since the last change in the signal.

10. A program stored on a non-transitory memory device for operating a scanner so as to execute a scanning method, the scanning method executed by the scanner in accordance with the program comprising:
calculating, with a processor, a speed related to the rotation of a motor on the basis of a signal that is outputted from an encoder; and
calculating, with the processor, a control amount on the basis of the speed calculated so as to control the rotation of the motor in accordance with the calculated control amount, and then controlling the motor with an increase in the control amount in a case where there occurs no change in the signal that is outputted from the encoder for a certain period of time, the increase in the control amount being based on the length of time that has elapsed since the last change in the signal.

* * * * *